G. MOSCRIP, Jr.
CAGE FOR BANANAS.
APPLICATION FILED FEB. 9, 1911.
1,007,477.
Patented Oct. 31, 1911.
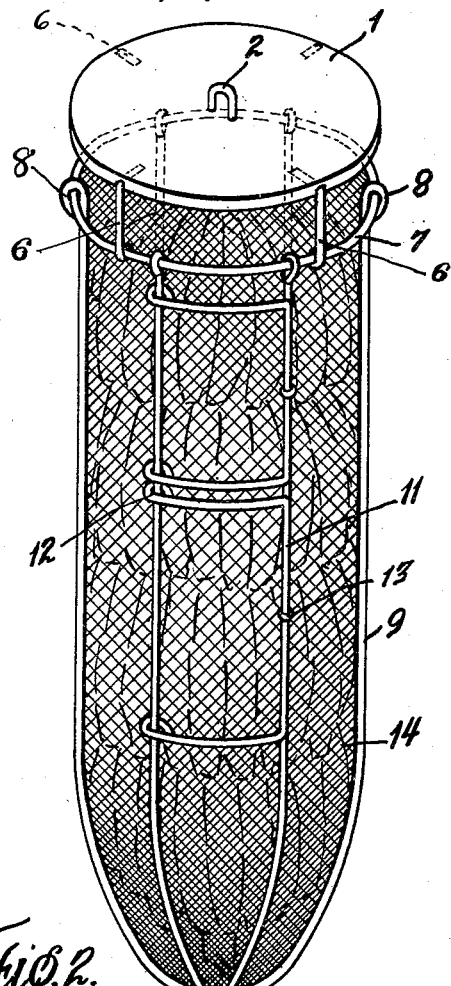
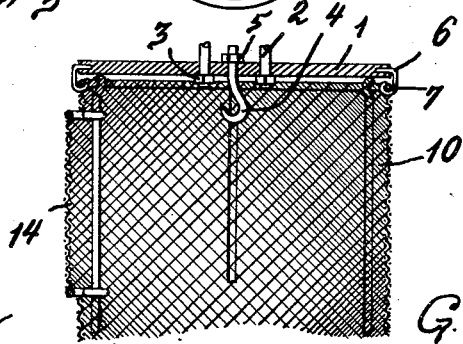
WITNESSES
INVENTOR
G. Moscrip, Jr.
Attorneys

UNITED STATES PATENT OFFICE.

GEORGE MOSCRIP, JR., OF ROBYVILLE, OHIO.

CAGE FOR BANANAS.

1,007,477.  Specification of Letters Patent.  Patented Oct. 31, 1911.

Application filed February 9, 1911. Serial No. 607,452.

*To all whom it may concern:*

Be it known that I, GEORGE MOSCRIP, Jr., a citizen of the United States of America, residing at Robyville, in the county of Harrison and State of Ohio, have invented certain new and useful Improvements in Cages for Bananas, of which the following is a specification, reference being had therein to the accompanying drawing.

This invention relates to a cage for banana bunches, and the primary object of the invention is to provide a novel inclosure for a bunch of bananas that will prevent the bananas from being injured by insects, rats and other animals.

A further object of the invention is to provide a perforated or wired gauze cage in which a bunch of bananas or other fruit can be suspended, thoroughly ventilated and prevented from injury by contacting with other bodies.

A further object of the invention is to provide a cage for protecting various kinds of fruit with a door whereby easy access can be had to the interior of the cage.

I attain the above objects by a cage that is simple in construction, durable, inexpensive to manufacture and highly efficient for protecting various kinds of fruit.

The invention will be hereinafter specifically described and then claimed, and reference will now be had to the drawing herein:—

Figure 1 is a perspective view of the cage, and Fig. 2 is a vertical sectional view of a portion of the same.

A cage in accordance with this invention comprises a circular head 1, made of wood or metal, said head having a central staple 2 by which the cage is suspended from a hook or suitable support. The staple 2 has the ends thereof extending through the head 1 and retaining an engagement therewith by nuts 3. The head 1 is also provided with a centrally depending hook 4 from which a bunch of bananas is suspended, said hook being retained in engagement with the head 1 by a nut 5 screwed upon the upper end thereof.

Detachably retained in engagement with the head 1 by a plurality of equally spaced hooks 6, carried by the edges of the head 1, is a ring 7 and this ring supports the eyelet ends 8 of a plurality of equally spaced loop-shaped rods 9, the looped ends of said rods forming the bottom of the cage. These rods are of a sufficient length and the head 1 of a sufficient diameter to provide a frame work for an inclosure large enough to retain a bunch of bananas, and said rods have the inner sides thereof provided with a screen or wire gauze 10, said screen preventing flies and other insects from disfiguring or injuring the fruit contained within the cage. In some instances the screen can be made of wire and in other instances of a fine fabric. When the cage is used by merchants who display their wares upon the side-walks or in places exposed to the forces of nature a fabric can be employed as a covering for the cage to exclude dust, dirt and other foreign matter.

In order that easy access can be had to the cage to remove fruit therefrom, doors are provided, each door comprising a wire frame 11 pivotally connected to one of the rods 9, as at 12 and adapted to be locked in engagement with another rod by a hook 13 or other fastening device. The screen 10 is cut away to provide the doorways and the wire frames 11 are covered with a gauze or fabric 14 similar to the covering of the cage.

It is thought that the utility of the device will be apparent without further description, and while in the drawings there is illustrated a preferred embodiment of the invention, it is to be understood that the structural elements are susceptible to variations as fall within the scope of the appended claims.

What I claim is:—

1. A cage for the purpose set forth comprising a disk-shaped head, a hook depending therefrom, a ring arranged below the head, hangers for detachably connecting the ring to the head, depending loop-shaped rods connected at their upper ends to said ring, and a screen cylindrical in sectional plan and arranged against the inner faces of said rod, said screen having its upper end open and its lower end closed.

2. A cage for the purpose set forth comprising a disk-shaped head, a hook depending therefrom, a ring arranged below the head, hangers for detachably connecting the ring to the head, depending loop-shaped rods connected at their upper ends to said ring, and a screen cylindrical in sectional plan and arranged against the inner faces of said rod, said screen having its upper end open and its lower end closed, said screen provided with door-ways, and doors carried by one of said rods and adapted to close the door-ways.

In testimony whereof I affix my signature in the presence of two witnesses.

GEORGE MOSCRIP, Jr.

Witnesses:
 HENRY WORNER,
 J. H. EGGENSCHWILER.

Copies of this patent may be obtained for five cents each, by addressing the "Commissioner of Patents, Washington, D. C."